No. 696,247. Patented Mar. 25, 1902.
H. W. LEONARD.
MULTIPLE CONTROL SYSTEM.
(Application filed Jan. 24, 1901.)
(No Model.) 5 Sheets—Sheet 1.

Fig. 1

Witnesses:
Jas. F. Coleman
Jno. R. Taylor

Inventor
H. Ward Leonard
by Dyer Edmunds & Dyer
Att'ys.

No. 696,247. Patented Mar. 25, 1902.
H. W. LEONARD.
MULTIPLE CONTROL SYSTEM.
(Application filed Jan. 24, 1901.)
(No Model.) 5 Sheets—Sheet 2.

Witnesses:
Jas. F. Coleman
Jno. R. Taylor

Inventor
H. Ward Leonard
by Ayer Edmonds
Att'ys.

No. 696,247. Patented Mar. 25, 1902.
H. W. LEONARD.
MULTIPLE CONTROL SYSTEM.
(Application filed Jan. 24, 1901.)
(No Model.) 5 Sheets—Sheet 3.

Witnesses: Inventor

No. 696,247. Patented Mar. 25, 1902.
H. W. LEONARD.
MULTIPLE CONTROL SYSTEM.
(Application filed Jan. 24, 1901.)
(No Model.) 5 Sheets—Sheet 4.

Fig. 5

Witnesses: Inventor
Att'ys.

UNITED STATES PATENT OFFICE.

HARRY WARD LEONARD, OF NEW YORK, N. Y.

MULTIPLE CONTROL SYSTEM.

SPECIFICATION forming part of Letters Patent No. 696,247, dated March 25, 1902.

Application filed January 24, 1901. Serial No. 44,565. (No model.)

*To all whom it may concern:*

Be it known that I, HARRY WARD LEONARD, a citizen of the United States, residing in the borough of Manhattan, in the city and State of New York, have invented a certain new and useful Improvement in Multiple Control Systems, of which the following is a specification.

My invention relates to the electric transmission of power; and my principal object is the operation of electric translating devices in such a way that one or more of such devices can be controlled from several different points.

One of the most important applications of my present invention is the simultaneous control of a plurality of electric motors located upon different cars composing a train, so that from any one of several different cars the motors can be operated at any desired speed and in either direction, while at the same time they will operate in harmony, dividing the load approximately in proportion to their capacity.

My invention is also capable of use in the operation of electric motors used for other purposes—as, for example, in connection with pumps, swinging bridges, elevators, cranes, guns, propellers, rudders, metal-rolls, moving sidewalks, printing-presses, cable power-transmitting devices, as well as valves and governors of engines, turbines, &c. My invention is, however, not limited to the control of electric motors; but may be utilized in controlling the voltage or the current supplied to other electric translating devices, such as electric lights, electric heaters, rheostats, circuit-controllers, electric furnaces, storage batteries, electrolytic cells, and, in fact, mechanism in general operated or controlled from several points through the agency of electric energy.

In order that my invention may be better understood, attention is directed to the accompanying drawings, forming a part of this specification, and in which—

Figure 1:
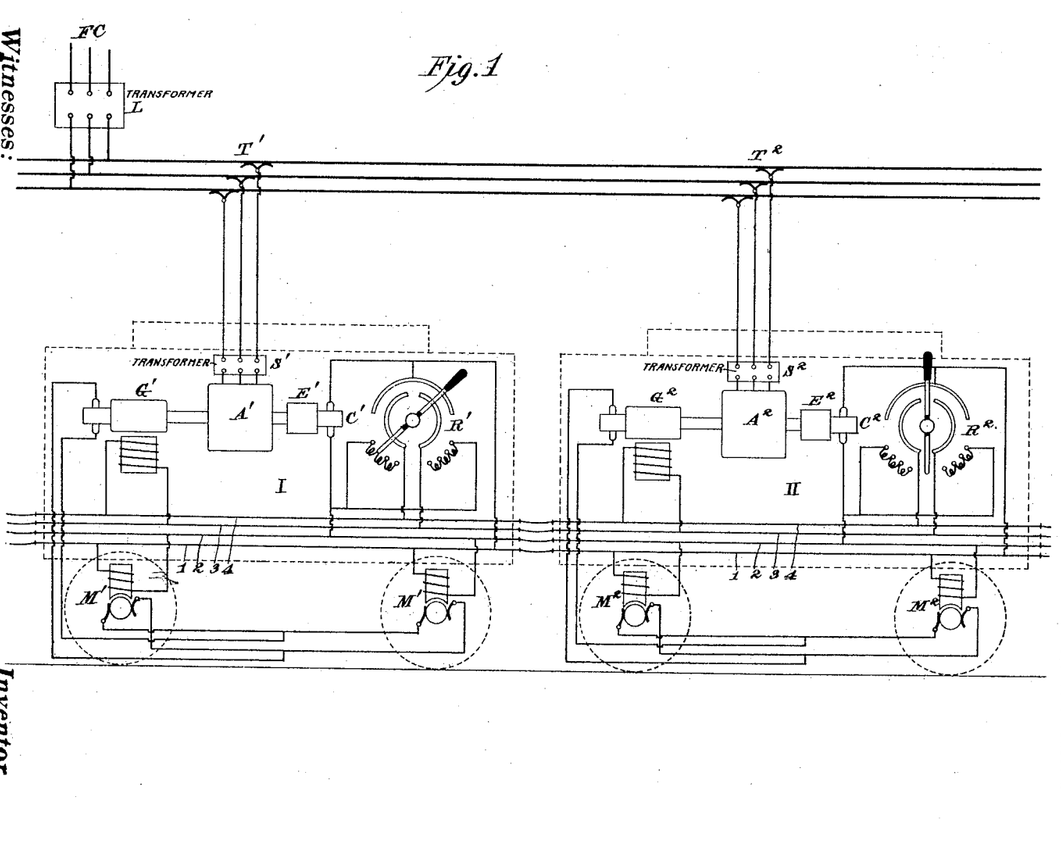
Figure 1 is a diagram illustrating two cars connected together to form a train, each being equipped with two operating-motors and each being provided with corresponding controlling mechanism, the original source of power being illustrated as a three-phase supply-circuit, with which collecting devices carried by the several cars make contact.
Figure 4:
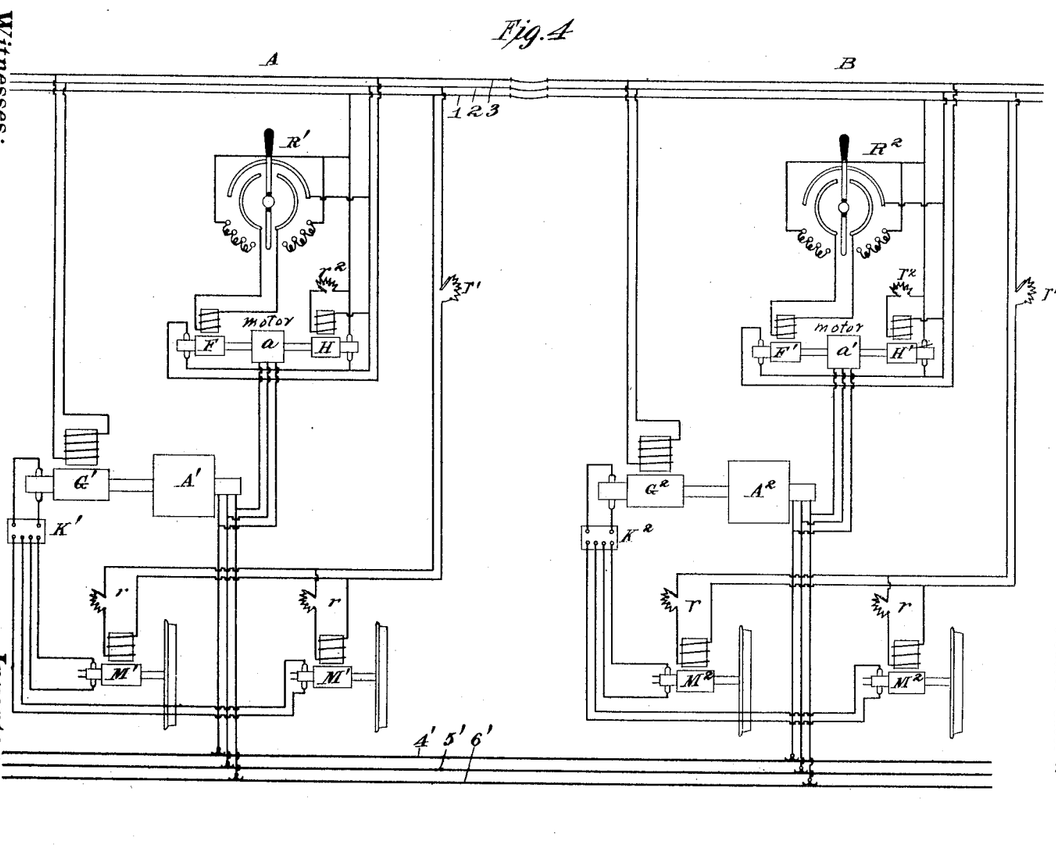
Fig. 4, a corresponding view illustrating two connected cars each equipped with two propelling-motors, a dynamo-electric generator, and an exciter of variable and reversible electromotive force, the original source of current being indicated as a three-phase circuit, and wherein also only three wires between the cars are necessary.

Referring first to Fig. 1, two cars I II are diagrammatically illustrated, the first being propelled by motors M' M' and the latter being propelled by motors $M^2 M^2$. The cars are mechanically connected to form a train and are electrically connected for the control of the several motors, as will be explained. A train may obviously be composed of more than two cars. The source of current illustrated is a three-phase circuit extending parallel to the track and with which collecting devices T' and $T^2$ on the cars are in constant contact. If desired, the three-phase circuit may be supplied with current from a feeding-circuit F C, connecting either directly to the three-phase circuit or by means of a step-down static transformer L. On each of the cars I illustrate motors A' $A^2$, respectively, which may be three-phase motors of the desired capacity and receive current either directly from the collecting devices T' $T^2$ or through the intermediate static transformers S' $S^2$. The armature-shaft of the motor A' drives a continuous current generator G', and the armature-shaft of the motor A² drives a continuous-current generator G². The armatures of the motors M' M' are connected in parallel and receive current from the generator G'. The armatures of the motors M² M² are also connected in parallel and receive current from the generator G². Each of the cars is provided with four conducting-wires 1 2 3 4, which are adapted to be connected by suitable couplings with the corresponding wires of the adjacent cars, as shown. The fields of all the motors M' M' M² M² are connected across the wires 1 2. The fields of the generators G' G² are connected across the wires 3 4. The armature of the motor A' drives a small generator or exciter E', while a corresponding generator or exciter E² is driven by the motor A². The armature C' of the exciter E' is connected across the wires 1 2, and the armature C² of the generator or exciter E² is connected across the same wires, whereby the circuit 1 2 will be supplied with a current of constant electromotive force from either exciter, feeding the fields of the several propelling-motors. R' is a reversing-rheostat on the first car, connected with the armature-circuit of the exciter E' and with the circuit 3 4 and by means of which current supplied to the circuit 3 4 may be varied in amount or reversed in sense. A corresponding reversing-rheostat R² is mounted on the second car and similarly connected between the armature of the exciter E² and the circuit 3 4. It will therefore be seen that the electromotive force supplied to the fields of the propelling-motors is constant and that the current supplied to the fields of the generators G' G² is variable and reversible, whereby the propelling-motors may be controlled in speed and direction. Thus, assuming both the motors A' and A² to be operating, that the handle of the reversing-rheostat R² occupies a neutral position, and that the brushes of the exciter E² are raised, so that no current will be supplied by that exciter, it will be seen that by properly manipulating the handle of the rheostat R' the current supplied to the circuit 3 4, and consequently to the fields of the generators G' and G², can be correspondingly increased or reduced or reversed, whereby the electromotive force, as well as the direction of current supplied by said generators to the armatures of the propelling-motors, is under absolute control. In this way it is possible to secure any desired speed up to maximum in either direction of rotation of the motors M' M' and M² M², and if these motors are practically identical they will at all times divide the load equally between them. It may sometimes be necessary to adjust the brushes or the field strength of the propelling-motors in order that they may be made practically identical in capacity; but after such adjustment they will continue to divide the load equally, commercially speaking, even when the speed is varied greatly or when the direction is reversed. In Fig. 4, to which I shall presently refer, I illustrate small rheostats in the fields of the propelling-motors by which they may be adjusted in the first instance, so as to divide the load proportionately or to compensate for any variation which may take place between them in use—as, for example, when the wheels driven by one motor may become worn, and thereby become smaller in diameter. If instead of operating the reversing-rheostat R', its handle is set to the neutral position and the brushes of the exciter E' are raised and those of the exciter E² are again engaged with its commutator a manipulation of the reversing-rheostat R² will effect a control of the electromotive force and direction of the current supplied by the exciter E² to the circuit 3 4, so as to simultaneously vary the strength or reverse the fields of the generators G' and G², whereby the speed of the several propelling-motors can be controlled simultaneously from the car 2. While I have illustrated and have referred to a three-phase motor on each car for the purpose of driving the continuous-current generator G' or G², it will be obvious that in many cases any other motor, electric or mechanical, can be utilized for this purpose. When it is desired to stop the train or a single car equipped as explained, the operator (assuming the rheostat R' to be in use) moves the operating-handle thereof through the whole extent of its resistance until the handle reaches the neutral position, thereby resulting in a gradual reduction of the current in the circuit 3 4, effecting a gradual reduction of the fields of the generators G' and G² and effecting a consequent reduction in the electromotive force supplied to the propelling-motors. When the operating-handle of the rheostat reaches its neutral position, no current will be supplied to the circuit 3 4 or by the generators G' and G² to the propelling-motors. Under these conditions of weakening the fields of G' and G² if the electromotive force of G' and G² falls below the electromotive force generated by the armatures of M' and M² the propelling-motors become generators and supply current to the generators G' and G², which act as motors to drive the motors A' A² as generators supplying current into the supply-circuit, thereby reducing the energy required for the operation of other trains on the same line from the original source of power and making it possible to stop the locomotive without mechanical brakes. To reverse the direction of movement, the operator moves the handle of the rheostat R' or R², as the case may be, past the central or neutral position, thereby reversing the field magnetism of the generators G' and G² simultaneously, and if the rheostat-handle is further moved to cut out more or less of the resistance the electromotive force of the generators will gradually and simultaneously increase up to the maximum in the reverse sense, thereby gradually increasing the speed of the propelling-motors in the opposite direction.

Figure 2:
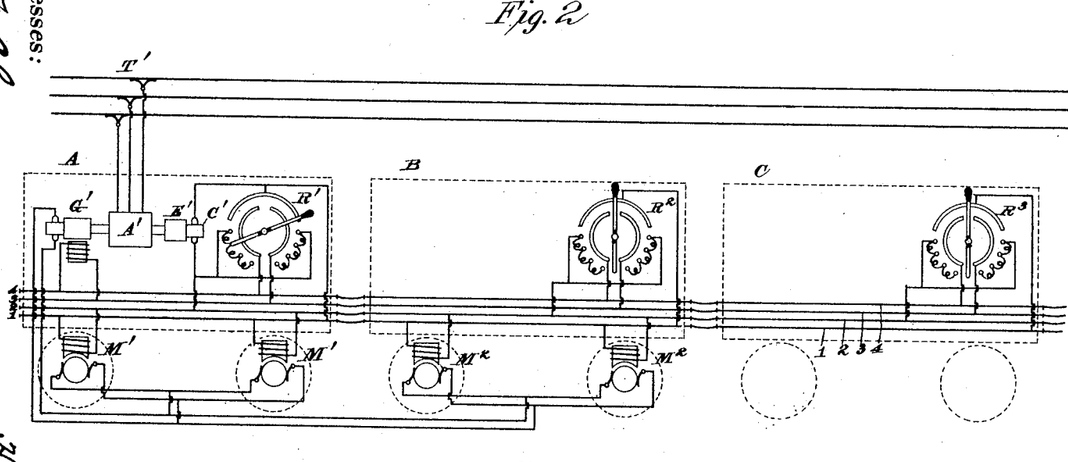
Fig. 2, a corresponding view illustrating three cars mechanically connected to form a train, two of them being equipped with propelling-motors, all of them with controlling-rheostats, and one only with a source of power and of current for the operating-motors.

In Fig. 2 I illustrate a train comprising three cars A B C, through all of which extend the circuit-wires 1 2, forming the constant-electromotive-force circuit, and the circuit-wires 3 4, forming the variable and reversible electromotive-force circuit. The car C is illustrated as being furnished only with a single reversing-rheostat $R^3$, by means of which current from the circuit 1 2 can be supplied to the circuit 3 4 and varied in amount or reversed in sense, as will be understood. The car B is provided with a reversing-rheostat $R^2$, similarly connected; but said car is also shown as being equipped with propelling-motors $M^2$ $M^2$, the fields of which are connected in parallel with the circuit 1 2, and the armatures of which are connected in parallel with a circuit supplied from the generator G' of the car A. The car A is provided with the same equipment as the cars shown in Fig. 1, except that the static transformer between the collecting devices T' and the motor A' is not illustrated. It will be seen that by manipulating either of the rheostats R', $R^2$, or $R^3$, the operating-handles of the other rheostats being maintained in a neutral position, the current supplied to the circuit 3 4 can be varied or reversed, thereby effecting a reduction in the field strength of the generator G' or securing a reversal of that field to secure any desired variation in the electromotive force or direction of current supplied to the several propelling-motors, whereby their speed will be simultaneously increased or diminished, while at all times they will maintain their proper proportion of the load. In this way the train as a whole can be effectively controlled from any one of the cars.

Figure 3:
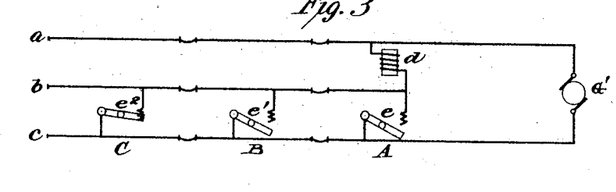
Fig. 3, a similar view illustrating the connections which may be employed when the current through the generator-field or other device is to be controlled from several different points, but not reversed, and in which case three wires only are necessary.

Referring to Fig. 3, I illustrate an arrangement of circuits whereby a translating device, illustrated diagrammatically as a magnet $d$, may be controlled from any one of a number of points A, B, or C, which may correspond with the cars of Fig. 2. A generator G', driven from any source of power—as, for example, by a motor receiving current from a suitable trolley system—supplies current to wires $a$ and $c$, which are connected together from car to car. Arranged on each of the cars is a rheostat $e$ $e'$ $e^2$, respectively, connected between the wire $c$ and a wire $b$, extending parallel therewith and between which and the wire $a$ the translating device $d$ is connected in parallel. It will be seen that by operating either of the rheostats $e$, $e'$, or $e^2$, the others being open, the current supplied to the translating device can be increased or diminished at will to properly control the latter and any devices affected by it.

In Fig. 4 I illustrate means for controlling a plurality of motors or other electric translating devices both as to their speed and as to the direction of rotation of their armatures or other movable elements from any point on a circuit of three wires. A controlling-motor $a$ is of any suitable type, electric or mechanical; but for the purpose of illustration I have represented it as a three-phase motor supplied by a circuit 4' 5' 6'. The motor $a$ drives the armature of a small shunt-dynamo H, which supplies current to the field of a controlling continuous-current generator F through a reversing-rheostat R', whereby the electromotive force and direction of current supplied by the exciter H to the field of the generator F may be varied or reversed, as may be desired. Thus the armature of the generator F will be driven by the motor $a$ at a practically constant speed in a field whose strength can be varied and its polarity reversed at will. The current therefore supplied by the generator F to the circuit-wires 2 3 will be of a variable and reversible electromotive force. The car B is likewise provided with an operating-motor $a'$, driving a shunt-dynamo H', which supplies current to the field of a controlling continuous-current generator F' through a reversing-rheostat $R^2$, as with the car A. G' $G^2$ represent two continuous-current generators driven from any suitable source of power, electrical or mechanical, and which may be separated to any desired extent, one, for example, being mounted on one of the cars A constituting a train and the other on another of such cars B, assuming the invention to be utilized for the controlling of the propelling-motors of a train composed of a series of motor-cars. Thus in Fig. 4 I illustrate the generator G' on the car A as being operated by a three-phase motor A' and the generator $G^2$ on the car B as being operated by a three-phase motor $A^2$, as in Fig. 1. The fields of the continuous-current generators G' $G^2$ are connected in parallel with the circuit 2 3, whereby the strength of such fields can be simultaneously varied and their polarity simultaneously reversed at will to permit such generators to supply currents of corresponding electromotive force and direction at all times. The armature of the generator G' is connected by a series-parallel switch K' with the armatures of the motors M' M', and the armature of the generator $G^2$ is connected by a series-parallel switch $K^2$ with the armatures of the propelling-motors $M^2$ $M^2$. The series-parallel controlling-switches K' and $K^2$ are of any common form by means of which the armatures of the motors M' M' or $M^2$ $M^2$ may be connected in series or in parallel with each other. The fields of the motors M' and $M^2$ are connected in parallel with a circuit 1 2, supplied with current of constant electromotive force from the exciter H, as shown. In the field of each of the propelling-motors M' M' or $M^2$ $M^2$ is preferably placed a small controlling-rheostat $r$, by means of which each of the motors may be adjusted so as to always assume its proportionate share of the load and by means of which the adjustment so effected can be varied when for any cause that is necessary—as, for example, when the wheels driven by that particular motor become worn and of reduced diameter. A controlling-rheostat $r'$ may also be mounted in the common circuit leading to the fields of the two motors $M'$ $M'$ or $M^2$ $M^2$ for each locomotive and by means of which both motors may simultaneously be varied when desired, in order that one locomotive as a unit may assume its desired or proportionate share of the load imposed on the train. A small rheostat $r^2$ in the field-circuit of the exciter H is also employed for the purpose of controlling the electromotive force thereof. In operation, assuming the motors $a$ $a'$ and generators $G'$ $G^2$ to be rotating at the proper approximately constant speed and the handle of each of the rheostats $R'$ $R^2$ to be in its central or neutral position current of constant electromotive force will be supplied—for example, by the exciter H—to the circuit 1 2 to energize the fields of the propelling-motors $M'$ $M^2$, the brushes of the exciter H' being raised. No current will, however, energize the fields of the controlling-generators F F', and in consequence no current will be generated in the circuit 2 3, so that the fields of the generators $G'$ and $G^2$ will not be excited, said generators will generate no current, and the motors $M'$ $M^2$ will therefore be at rest. By gradually moving the handle of the rheostat R', for example, current in one direction or the other will be permitted to energize the field of the controlling-generator F, with the desired polarity and with gradually-increasing strength, whereby a current of gradually-increasing electromotive force will be generated in the circuit 2 3. The strength of the fields of the generators $G'$ and $G^2$ will be correspondingly increased and a current of gradually-increasing electromotive force will be generated by the generators $G'$ and $G^2$ to supply the motors $M'$ and $M^2$, which will start to operate at a gradually-increasing speed. In this way obviously the speed of the motors $M'$ and $M^2$ can be simultaneously controlled and the direction of their armatures reversed by either the rheostat R' or $R^2$ or by means of any other rheostat having the capacity of varying the electromotive force and the direction of current supplied to the circuit 2 3, it being understood that the rheostats which are not operating are maintained in their neutral position and that the adjacent exciting-generators H H', &c., are out of circuit. Obviously by connecting to the circuits 1 2 and 2 3 a controlling apparatus comprising a motor $a$, an exciter H, a controlling-generator F, and a rheostat R', as explained, the speed of the propelling-motors can be simultaneously controlled and the direction of rotation of their armatures reversed from any other point on the circuit composed of the three conductors 1 2 3. Instead of varying the electromotive force of the controlling-generator F, by producing variations in the field strength thereof, it will of course be understood that the result can be secured in other ways familiar to those skilled in the art—as, for example, by varying the speed of rotation of the armature of the controlling-generator or by reversing the sense of rotation thereof when a reversal of the polarity of the generators $G'$ and $G^2$ is desired.

Figure 5:
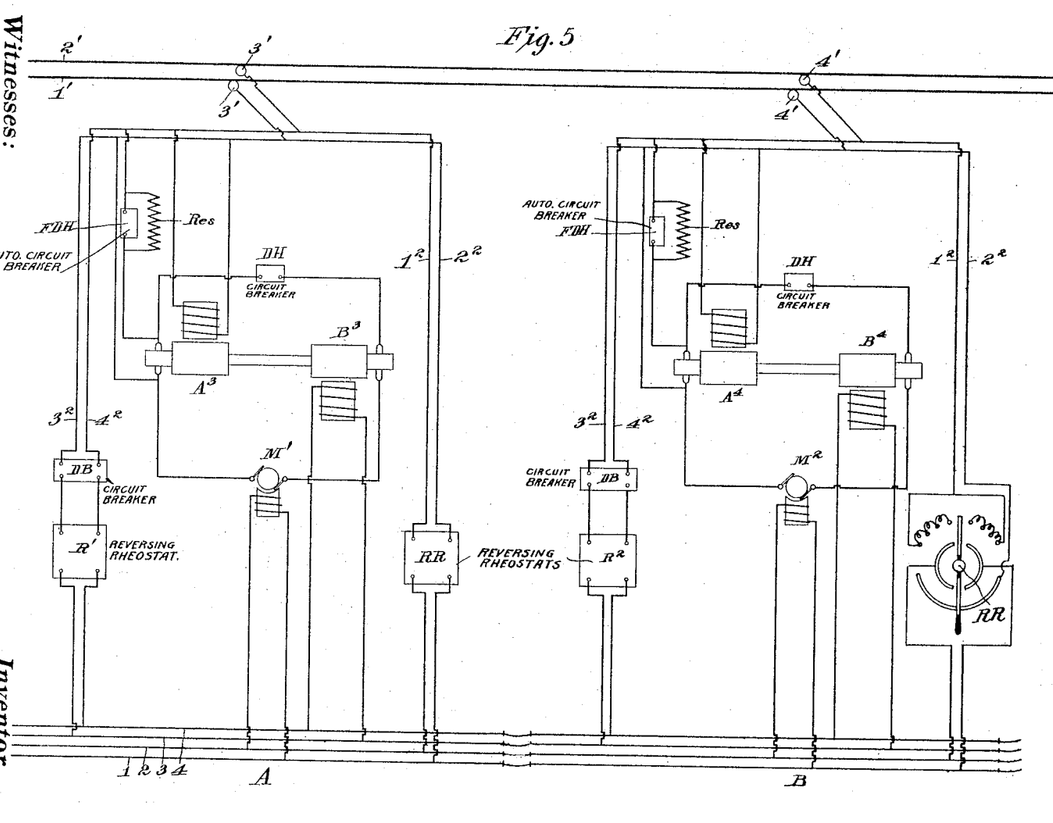
Fig. 5, a corresponding view showing two cars, the propelling-motors of which are controlled by the counter-electromotive-force system described and claimed in my Patent No. 572,903, the original source of current being continuous.

In Fig. 5 I illustrate the connections which may be used in two connected cars when the original source of current is unidirectional and of constant electromotive force and wherein may be employed a counter-electromotive-force system, as I describe in my Patent No. 572,903, for controlling the several motors. $1'$, $2'$ represent a circuit of constant electromotive force and of continuous current, and $3'$ $3'$ $4'$ $4'$ collecting devices carried by the two cars. On the car A is a shunt-machine $A^3$, its field and armature being connected across the collecting devices $3'$ $3'$, as shown. On the car B is a corresponding shunt-machine $A^4$, similarly connected. The machine $A^3$ is mechanically connected with the armature of the dynamo-electric machine $B^3$, and the machine $A^4$ is mechanically connected with the armature of the dynamo-electric machine $B^4$. I have referred to these elements generally as "shunt-machines" and "dynamo-electric" machines, because at some times they operate as motors and at other times they operate as generators. Preferably the armatures of the dynamos $A^3$ and $B^3$ and of $A^4$ and $B^4$ are mounted on the same shafts, as is common in the construction of motor-generators. The armatures of the propelling-motors $M'$ and $M^2$, respectively, are connected, as shown, in series with the armatures of the dynamos $A^3$ $B^3$ and $A^4$ $B^4$, so that each of said propelling-motors will be connected in a local loop on its respective car. Connecting the cars are the wires 1 2 3 4, as in Fig. 1, 1 and 2 being a circuit of constant electromotive force and 3 and 4 a circuit of variable and reversible electromotive force. The circuit 1 2 is supplied by connections $1^2$ $2^2$ from the source of supply, as shown, and each of the circuits $1^2$ $2^2$ is provided with a reversing-rheostat R R therein, by means of which the current in the circuit 1 2 may be reversed in sense when it is desired to reverse the direction of rotation of the propelling-motors $M'$ $M^2$. The fields of said propelling-motors are connected across the circuit 1 2, as shown, so that said fields will be at all times energized by a current of constant electromotive force. The circuit 3 4 is supplied from the source of supply by wires $3^2$ $4^2$, as shown, and in each of said circuits is a controlling-rheostat R' $R^2$, as shown, by means of which the amount and the direction of the current supplied to the circuit 3 4 may be controlled. The operating-handle of each of the rheostats R' $R^2$ is preferably arranged to be returned automatically by means of a spring or weight, as is common in the art, to the position in which the current supplied to the circuit 3 4 will energize the fields of the dynamo-machines $B^3$ and $B^4$, whereby the electromotive force of such dynamos will be equal and opposite to the line electromotive force, so that in case of accident the train will automatically come to rest. In each circuit $3^2\ 4^2$ is mounted a circuit-breaker D B, arranged to be manually opened or closed by the operator, while in circuit with the armature of each of the dynamo-machines $A^3\ A^4$ is a circuit-breaker F D H of common form, arranged to break the circuit when the supply-voltage fails from any cause or when a current of objectionably high amperage influences the same. Shunting each of the automatic circuit-breakers F D H is a resistance Res. In order to protect the dynamos $B^3\ B^4$ and the motors $M'\ M^2$ from destructive currents, I also preferably place a circuit-breaker D H in each of the local loops $A^3\ B^3\ M'$ or $A^4\ B^4\ M^2$, whereby said circuit-breakers will open said circuits when a destructively large current influences the same. In operation let it be supposed that from any cause there is no voltage on the line-circuit $1'\ 2'$ and that the train is at rest. The circuit-breakers F D H are all open, and the resistances Res will therefore be in series with each of the shunt-machines $A^3$ and $A^4$. The controllers $R'\ R^2$ have been moved by their automatic springs, so that there is no resistance in series with the fields of the regulating-machines $B^3\ B^4$, and the connections are such that the electromotive force of $A^3$ and $B^3$ and $A^4$ and $B^4$ will be counter to each other in the loops $A^3\ B^3\ M'$ and $A^4\ B^4\ M^2$. Assume now that the full electromotive force is impressed on the main circuit $1'\ 2'$. This excites the fields of the dynamos $A^3\ B^3\ A^4\ B^4$ and of the motors $M'\ M^2$, and current will also flow through the resistances Res and the armatures of the dynamos $A^3\ A^4$. The dynamos $A^3\ A^4$, operating as motors, start into motion and accelerate both themselves and the dynamos $B^3\ B^4$. Since the dynamos $A^3\ B^3$ and $A^4\ B^4$ are operating in full fields and are counter to each other in their respective loops, their full electromotive forces will be equal and opposite, and no current will flow through the armatures of the motors $M'$ and $M^2$. Hence no power will be consumed in bringing the dynamos $A^3\ B^3$ and $A^4\ B^4$ up to their full speed except the friction load. Assuming that the line-voltage in the circuit $1'\ 2'$ is five hundred and fifty volts, that the resistances Res are each 2.5 ohms, and that twenty amperes are required to operate the dynamos $A^3\ A^4$ after they have been accelerated, then fifty volts will be dropped upon each resistance and the dynamos $A^3\ B^3$ and $A^4\ B^4$ will be producing nearly five hundred volts. The operator now closes the circuit-breaker F D H on the car from which the train is to be controlled—for example, car A—cutting out the resistance and bringing up the dynamos $A^3\ B^3$ to their full speed. There will still be no current of any consequence in the loop $A^3\ B^3\ M'$. The operator now closes the circuit-breaker F D H successively on the other cars of the train until the dynamos on those cars are also brought up to full speed. He next sees that all the circuit-breakers D B in series with the various controlling-rheostats are open except the one in series with the controlling-rheostat which he intends to use. If he has been using a certain one and wishes to use another, he must first close the circuit-breaker D B at the controlling-rheostat he intends to use and then open the corresponding circuit-breaker at the controlling-rheostat he is leaving, so that the fields of the dynamos $B^3\ B^4$ will not be opened in the operation. It will be seen that if this were done the dynamos $B^3$ and $B^4$ would not generate a counter electromotive force to the line, and hence the full unbalanced line electromotive force would influence the propelling-motors $M'\ M^2$. To meet such a contingency as this, I have made use of the automatic circuit-breakers D H, as explained. By now operating the handle of the controlling-rheostat $R'$, for example, on the car A, the fields of the dynamos $B^3$ and $B^4$ can be similarly and simultaneously weakened, as I describe in my said patent, thereby reducing the counter electromotive force generated by said dynamos and permitting current to flow through each of the local loops to correspondingly actuate the propelling-motors. When the entire resistance of the controlling-rheostat $R'$ has been cut in, a further movement of the handle may actually break the circuits $3^2\ 4^2$, so that no current will influence the circuit 3 4, and the fields of the dynamos $B^3\ B^4$ will hence be *nil*. The dynamos $B^3\ B^4$ will therefore generate no counter electromotive force, and hence the full line-voltage will be permitted to influence the propelling-motors $M'\ M^2$. By now moving the handle of the controlling-rheostat $R'$ still farther the direction of current in the circuit 3 4 will be reversed and will be gradually increased in amount. The dynamos $B^3\ B^4$ will therefore act as boosters, adding their electromotive force to that of the line, so that when they are operating at their maximum duty the voltage applied to the motors $M'\ M^2$ will be practically double that of the line-voltage. When it is desired to reverse the direction of rotation of the propelling-motors $M'\ M^2$, the result may be secured by operating the reversing-rheostat R R when the electromotive forces of $A^3$ and $B^3$ are counter and approximately equal, which will reverse the current in the circuit 1 2, and thereby reverse the polarity of the motor-fields. Instead of performing these operations a rheostat may be placed in the field of the dynamos $A^3\ A^4$, so that by weakening said fields the electromotive force of the dynamos $B^3\ B^4$ will exceed that of the dynamos $A^3\ A^4$, causing current to flow in the opposite direction through the local loops to reverse the direction of rotation of the propelling-motors.

Figure 6:
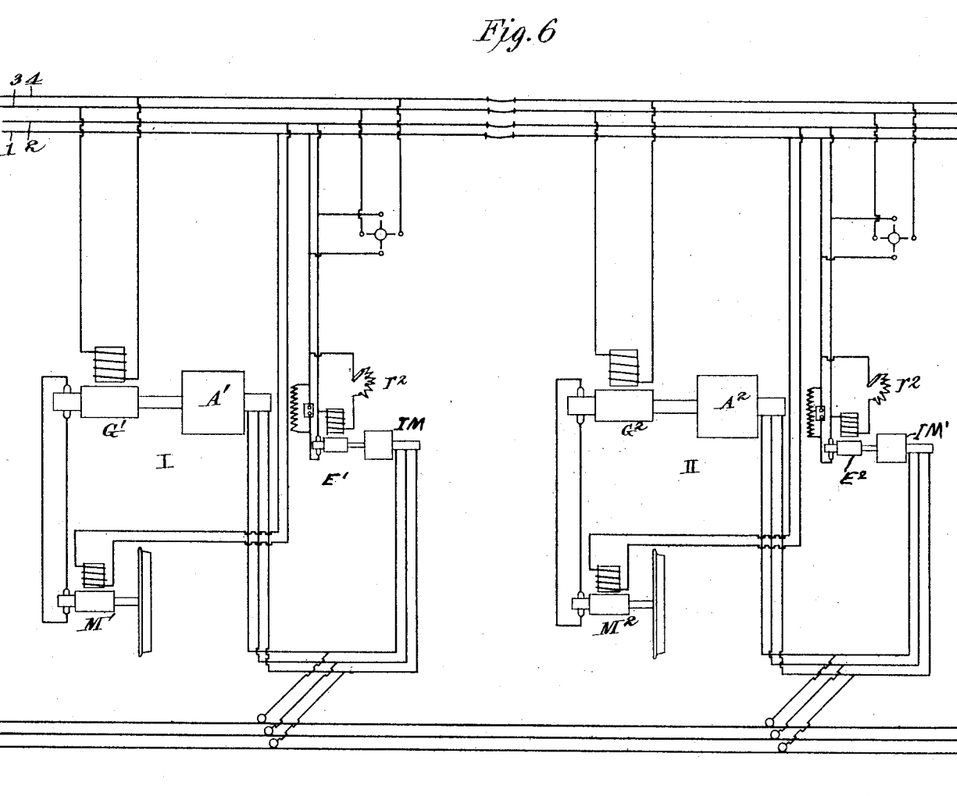
Fig. 6 a corresponding view showing a system substantially like that illustrated in Fig. 1, except that the exciter is driven by a separate small motor—in the present instance a three-phase motor.

Referring to Fig. 6, an arrangement closely analogous to that illustrated in Fig. 1 is shown, with the exception that the exciters $E'$ and $E^2$ are driven from small independent motors I M and I M'—in the present instance three-phase motors. I also show the field of each of the exciters E' and E² as being controlled by a small rheostat r², corresponding to the controlling-rheostat of the exciter H of Fig. 4. In other respects the construction and operation of the parts shown in this figure will be clear to those skilled in the art.

In some instances the machines A and G need not necessarily be separate machines, since any known form of electric-energy transformers may be employed which will receive electric energy in any suitable form and deliver a continuous current of controllable electromotive force instead of the separate machines. In some instances instead of employing dynamo-electric generators for exciting the fields of the propelling-motors or for supplying other circuits used in the apparatus other forms of current-supply can be utilized—as, for example, primary or secondary batteries, thermo-electric generators, or magneto-machines. It will, furthermore, be understood that other forms of generators and motors can be utilized from those shown—as, for example, the generators may be compound wound and the motors may be series wound. Furthermore, it will be obvious that all known forms of series parallel control may be used in connection with the motor-armatures. It will also be understood that instead of reversing the rotation of the motor-armatures by reversing the current in the supplying-generators therefor the current supplied by the generators may be maintained in a constant direction and a reversing-switch be interposed between the same and the motor-armature for reversing the current in the latter, or the field of the motor may be reversed. It will also appear from my description that instead of operating the several controlling-motors or the motors for driving the generators by electric energy mechanical motors for the purpose may be utilized and that instead of using a three-phase current, as explained, a single-phase or any other form of alternating current or electric current adapted to produce another by induction can be employed.

By the use of the term "transformer of electric energy," as used by me in the following claims, I mean to include any and all forms of devices which receive electric energy in one winding and as a result thereof simultaneously deliver electric energy from another winding. By "source of alternating electromotive force" or "alternating current" I mean to include any variable current which produces another current by inductive action.

I do not claim herein the arrangement of my system involving the use of three conductors on the train, nor do I claim herein the method of controlling electric motors described herein, since both those features of my invention are embodied in separate divisional applications.

Having now described my invention, what I claim as new, and desire to secure by Letters Patent, is as follows:

1. The combination of two dynamo-electric machines each having a separately-excited field and means by which both fields can be similarly varied from two different places, substantially as set forth.

2. The combination of two dynamo-electric machines each having a separately-excited field and means by which both fields can be similarly varied and reversed from two different places, substantially as set forth.

3. The combination of two dynamo-electric generators each having a separately-excited field, an electric motor connected to each of the said generators, and means at two different places for similarly controlling the electromotive force of the two generators, for the purpose of similarly varying the speed of the two motors, substantially as set forth.

4. Two electric vehicles, each equipped with an electric motor, a dynamo on each of the said vehicles for supplying its respective motor and means on each vehicle by which the voltage produced by the dynamos can be similarly varied from a controlling point on each car, substantially as set forth.

5. A source of alternating current, an electric railway supplied thereby, a train of cars on said railway, moving contacts for leading the alternating current upon the train of cars, an alternating-current motor on the said train, a continuous-current generator driven by the said alternating-current motor and having a separately-excited field and means on two or more different cars of the train for controlling the field strength of the continuous-current generator for the purpose of thereby controlling its electromotive force, and motors on different cars which are supplied by the said generator and whose speed can thus be similarly varied from several points on the said train, substantially as set forth.

6. A source of alternating electromotive force, two or more vehicles on an electric railway supplied from said source, each vehicle having a motor-generator consisting of an alternating-current motor and a continuous-current generator, an electric motor on each vehicle supplied from the generator on that vehicle, and means on each vehicle for controlling from that vehicle the speed of the motors on both vehicles, so that the two vehicles can be operated as a train and controlled from each vehicle at will, substantially as set forth.

7. Two cars operated as a train, each car having its own motor, a continuous-current generator on each car for supplying current to the armature of its specific motor, a source of constant electromotive force and continuous current on each car for separately exciting the field of the generator of that car, a system of wiring connected between the cars so that the separate exciter of either car can be used to excite the fields of both generators and controlling means on each car by which the field strength of the generators on both cars can be similarly and simultaneously varied from either car at the will of the operator, so that the two cars can be made to operate similarly in the train and the motors will divide the load proportionately, substantially as set forth.

8. A system of four wires extending along a train of cars and connected between the cars, a source of constant electromotive force and continuous current connected between one pair of wires, translating devices connected between the second pair of wires, and a reversing-rheostat connected between the first pair and second pair of wires, so that by manipulating the said reversing-rheostat the current supplied to the translating devices can be varied in amount and reversed in direction, substantially as and for the purpose set forth.

9. In an electric railway, a train of cars, a pair of conductors connected to a source of constant electromotive force and continuous current, and extending along the train, a second pair of conductors extending along the train and having the field-magnet of a dynamo-electric machine connected therewith, and on several different cars, a rheostat and reversing-switch for connecting the second pair of conductors with the first pair so that by manipulating any one of the said reversing switches and rheostats, the field-magnetism of the dynamo-electric machine can be varied in amount and reversed in sense, substantially as set forth.

10. A pair of conductors connected to a source of constant electromotive force and continuous current, a second pair of wires which at several different points can be connected to the first pair through a reversing-rheostat, the field-magnets of several dynamos connected across the second pair of wires and a motor connected with each of the said dynamos, so that by manipulating any one of the said rheostats the field-magnetism of the dynamos can be varied and reversed and the motors thereby similarly and simultaneously varied in speed and reversed in direction of rotation, substantially as set forth.

11. A source of alternating current, an electric railway supplied thereby, several vehicles coupled together mechanically to form a train, an electric motor of continuous current on each of the said vehicles, means on each of the said vehicles for transforming the energy of the alternating current into a continuous current of variable voltage and supplying such continuous current of variable voltage to its respective motor, and means on each of the said vehicles for simultaneously and similarly controlling the voltage of the continuous-current energy, so that the speed of the motors of the several vehicles can be similarly and simultaneously controlled from either of the vehicles at the will of the operator, substantially as set forth.

12. A source of alternating current, an electric railway supplied thereby, several vehicles on said railway coupled together to form a train, means on each vehicle for transforming the alternating-current energy into continuous-current energy, an electric motor on each of the said vehicles supplied by said continuous current and means on each of the said vehicles by which from any one of the vehicles the motors of the several vehicles can be varied in speed and reversed in direction similarly and simultaneously, substantially as set forth.

13. Two electric vehicles in a train, each having upon it the following apparatus: a continuous-current propelling-motor, a continuous-current dynamo connected to the said motor, and a source of constant electromotive force for exciting the field-magnet of the said dynamo and connections between the armatures of the said dynamo and the said motor; a rheostat on each vehicle for controlling the electromotive force of its dynamo; a system of wiring between the cars by which the said dynamo field-magnets can be similarly and simultaneously varied by manipulating either one of the said rheostats, so that the operator can, from either vehicle, similarly and simultaneously control the movement of both vehicles in a train, substantially as set forth.

14. A source of alternating current, an electric railway supplied thereby, two vehicles coupled together to form a train, an electric motor on each vehicle, regulating means on each vehicle for varying the voltage of the energy supplied to its motor, a system of wiring between the vehicles connecting together the said regulating means, and means on each vehicle by which the operator can similarly and simultaneously control the speed of the motors on the two vehicles, substantially as set forth.

15. An electrically-operated vehicle having upon it a generator of continuous current, a source of continuous current for separately exciting the field-magnet of the said generator, a propelling-motor electrically connected with the said generator and a rheostat for controlling the field of the generator; another electrically-operated vehicle coupled with the first to form a train, and wires between the two vehicles, connecting the said rheostat with another rheostat on the other vehicle so that an operator on either vehicle can, by manipulating the rheostat on that vehicle, similarly and simultaneously control the movement of the two vehicles as a train, substantially as set forth.

16. A source of electric energy, a multiple-arc distribution leading therefrom, an electric railway supplied thereby, several vehicles on said railway coupled together to form a train, an electric motor on each of the said vehicles, means on the train for controlling the electromotive force of a source of electric energy supplying energy to one element of the motors, and means on each of the said vehicles by which the operator can, from that particular vehicle, vary the electromotive force of the energy supplied to the motors, for the purpose of varying the speed of the motors, substantially as set forth.

17. A source of electric energy, an electric railway supplied thereby, several vehicles on said railway coupled together to form a train, an electric motor on each vehicle, a transformer of electric energy one of whose windings is connected with the armature-terminals of the said motors and means on several vehicles by which from each such vehicle the operator can control the energy supplied to the several motors, for the purpose of controlling them similarly and simultaneously, substantially as set forth.

18. A source of electric energy, an electric railway supplied therefrom, a revolving transformer on the train receiving electric energy from the source and delivering electric energy to the propelling-motors of the train, and means on several different cars of the train whereby an operator on any such car can control the speed of the several propelling-motors simultaneously and similarly, substantially as set forth.

19. A source of electric energy, an electric railway supplied thereby, a circuit parallel to the railway, moving contacts for leading the current upon a train having several cars, one or more of the cars having a propelling-motor, a revolving transformer of electric energy on the train receiving energy from the source and delivering energy to the armatures of the said motors, and means on several different cars, by which from any such car the voltage of the energy supplied to the said motors can be controlled and varied at the will of the operator, substantially as set forth.

20. A train of cars, several of the cars having electric propelling-motors, a source of electric energy on the said train for supplying the said motors, and means on several of the cars by which from any such car the energy supplied to the several motors can be simultaneously and similarly varied, substantially as set forth.

21. A train of cars, several of the cars having propelling-motors, a local circuit on the train, containing the armatures of the several motors, and means on several different cars by which from any such car the operator can vary the electromotive force generated in the said local circuit for the purpose of varying the speed of the motors, substantially as set forth.

22. A source of electric energy, a revolving transformer of electric energy whose primary is connected with said source and whose secondary contains the armature of an electric motor and means at several different points for controlling from such a point the speed of said electric motor, substantially as set forth.

23. A motor supplied with energy from the secondary of an electric-energy transformer and means at two or more different points for controlling the electromotive force of the energy developed by the secondary of the said transformer, substantially as set forth.

24. A source of alternating current, means for transforming the alternating current into a unidirectional current, a translating device supplied by said unidirectional current, and means at two or more different points by which from each of said points the electromotive force of the said unidirectional energy can be varied at the will of the operator, so as to vary the electromotive force upon the said translating device, substantially as set forth.

25. Several electric motors working in unison and dividing a certain load, a source of electromotive force connected to the said motors, and means at two or more different points for controlling the electromotive force of the said source for the purpose of similarly and simultaneously controlling the speed of the said motors, substantially as set forth.

26. A source of electric energy, several secondary sources of electromotive force derived therefrom and means at two or more different points for similarly and simultaneously varying the electromotive force of the said secondary sources independently of the electromotive force of the original source, substantially as set forth.

27. A source of alternating primary current, a unidirectional secondary current produced thereby, an electric motor operated by the secondary and means at two or more different points by which the electromotive force generated in the secondary circuit can be varied at the will of the operator for the purpose of varying the speed of the motor, substantially as set forth.

28. The combination of two independent sources of electromotive force, and means at two different places by which the electromotive forces of the two sources can be similarly controlled from zero to the maximum electromotive force, substantially as set forth.

29. The combination of two independent sources of electromotive force, and means at two different places by which the electromotive forces of the two sources can be similarly controlled from zero to the maximum electromotive force and can also be similarly reversed in sense, substantially as set forth.

30. The combination of two electric vehicles, each equipped with an electric motor, a source of electromotive force on each of the said vehicles affecting the operation of its respective motor, and means on each vehicle by which the electromotive forces produced by the said two sources of electromotive force can be similarly and simultaneously controlled, substantially as set forth.

31. A source of electric energy, an electric railway supplied thereby, several vehicles on said railway coupled together to form a train, an electric motor on each vehicle, a transformer of electric energy one of whose windings is connected with one element of each of the said motors, and means on several vehicles by which from each such vehicle the operator can control the energy supplied to the several motors for the purpose of controlling them similarly and simultaneously, substantially as set forth.

32. A source of electric energy, an electric railway supplied therefrom, a revolving transformer on the train receiving electric energy from the source and delivering electric energy to one element of a propelling-motor upon the train, and means on several different cars of the train whereby an operator on any such car can control the speed of the propelling-motor, substantially as set forth.

33. A source of electric energy, an electric railway supplied thereby, a circuit parallel to the railway, moving contacts for leading the current upon a train having several cars, one or more of the cars having a propelling-motor, a revolving transformer of electric energy on the train receiving energy from the source and delivering energy to one element of each of the said motors, and means on several different cars by which from any such car the voltage of the energy supplied to the said motors can be controlled and varied at the will of the operator, substantially as set forth.

34. A train of cars, several of the cars having electric propelling-motors, an electromotive force producing winding connected to one element of each of the motors, and means on several of the cars by which from any such car the electromotive force produced by the said electromotive force producing winding can be simultaneously and similarly varied, whereby the several motors are similarly and simultaneously controlled, substantially as set forth.

35. A source of electric energy, a revolving transformer of electric energy whose primary is connected with said source and whose secondary contains one element of an electric motor, and means at several different points for controlling from such a point the speed of said electric motor, substantially as set forth.

36. A dynamo-electric generator having a separately-excited field, two independent dynamo-electric machines either of which can be employed at the will of the operator for exciting the field of the said generator, and means for reversing the field of the generator, substantially as set forth.

37. The combination of two motors each independently supplied with energy by an electric generator, and means by which the electromotive forces of the two generators can be similarly varied for the purpose of similarly controlling the speed of the motors, substantially as set forth.

38. The combination of two motors, each independently supplied with energy by an electric generator, and means by which the electromotive forces of the two generators can be similarly varied and reversed for the purpose of similarly controlling the speed and direction of rotation of the rotating element of the motors, substantially as set forth.

39. Two translating devices, each having in series with it an independent electromotive-force-producing device, and means by which the electromotive forces developed in series with the two translating devices can be similarly and simultaneously varied, substantially as set forth.

40. Two translating devices, each having in series with it an independent electromotive-force-producing device, and means by which the electromotive forces developed in series with the two translating devices can be similarly and simultaneously varied and reversed, substantially as set forth.

41. An electric motor one of whose elements has in series with it an electromotive-force-producing device, and means at several different points for controlling the electromotive force produced by the electromotive-force-producing device, whereby the speed of the motor is controlled, substantially as set forth.

42. An electric motor one of whose elements has in series with it an electromotive-force-producing winding, and means at several different points for controlling at that point the magnetic field affecting the said electromotive-force-producing winding, substantially as set forth.

43. Two electric motors working upon a common load and whose armatures are in multiple-arc relation with each other, a source of electromotive force in series with the armatures of the motors, and means for controlling from zero to a maximum the electromotive force produced by the said source, whereby the speed of the said motors is similarly controlled, substantially as set forth.

44. Two electric motors working upon a common load and whose armatures are in multiple-arc relation with each other, a source of electromotive force in series with the armatures of the motors, and means for controlling at several different points from zero to a maximum the electromotive force produced by the said source, whereby the speed of the said motors is similarly controlled, substantially as set forth.

45. A source of alternating current, two revolving transformers of electric energy connected therewith, and an electric motor one of whose elements is supplied from one of the said transformers and whose other element is supplied from the other transformer, substantially as set forth.

46. A source of alternating current, two independent transformers each of which transforms the alternating current into a unidirectional current, and an electric motor whose two elements are supplied by unidirectional currents from the said transformers, substantially as set forth.

47. A source of alternating current, an electrically-propelled vehicle operated thereby, means upon the vehicle for transforming the alternating current into a unidirectional current, and a propelling-motor for the vehicle, one of whose elements is supplied by the said unidirectional current, substantially as set forth.

48. A source of polyphase currents, two independent revolving transformers of electric energy connected therewith, each of which transforms the polyphase current into unidirectional current, and an electric motor whose two elements are supplied with unidirectional current from the two revolving transformers, substantially as set forth.

49. The combination of several dynamo-electric machines whose fields are in multiple with each other, and means for simultaneously and similarly varying and reversing the said fields, substantially as set forth.

50. A moving load which is retarded by the production of electric energy, a translating device, and a revolving transformer which receives such electric energy, transforms it and delivers it to said translating device in the form of alternating-current energy, substantially as set forth.

51. A moving load which is retarded by the production of unidirectional electric energy, a translating device, and a revolving transformer which receives such electric energy, transforms it and delivers it to said translating device in the form of alternating-current energy, substantially as set forth.

52. A moving load which is retarded by the production of electric energy, a translating device, and a revolving transformer which receives such electric energy, transforms it and delivers it to said translating device in the form of polyphase alternating-current energy, substantially as set forth.

53. A source of alternating-current energy, an electrically-propelled vehicle supplied thereby, a revolving transformer of electric energy upon the vehicle, a propelling-motor which utilizes said transformed energy, a second electrically-propelled vehicle mechanically connected to the first vehicle, and means on each vehicle by which from that vehicle both vehicles can be simultaneously controlled, substantially as set forth.

54. Several electrically-propelled vehicles, each having several driven axles and each driven axle having its own driving-motor, mechanical couplings between the several vehicles, a source of electric energy on one or more of said vehicles, circuits extending throughout the several vehicles and to which said source or sources and said motors are connected, the connections of the motors being such that each motor will assume its proportionate share of the total load in starting and operating at various speeds, and a controlling device on each vehicle by means of any one of which the energy developed by said source or sources and hence the energy delivered to said motors may be controlled or varied.

55. Several electrically-propelled vehicles, each having several driven axles and each driven axle having its own driving-motor, mechanical couplings between the several vehicles, a source of electric energy on one or more of said vehicles, circuits extending throughout the several vehicles and to which said source or sources and said motors are connected, the connections of the motors being such that each motor will assume its proportionate share of the total load in starting and operating at various speeds, and a controlling device on each vehicle by means of any one of which the energy developed by said source or sources and hence the energy delivered to said motors may be controlled or varied without the use of resistances in the motor-circuits.

56. A generator located upon an electrically-propelled vehicle and whose field is separately excited, wires leading the said field-circuit upon another electrically-propelled vehicle, and means upon said latter vehicle by which the field of the generator can be controlled, substantially as set forth.

57. Several electric motors, each having a separately-excited field-winding, and means for simultaneously reversing the several motors, substantially as set forth.

58. Several electric generators, each having a separately-excited field-winding, and means for simultaneously reversing the said fields, substantially as set forth.

59. Several dynamo-electric machines, each having a separately-excited field-winding, means for simultaneously and similarly varying all of the said fields, and means for simultaneously and similarly reversing all of the said fields, substantially as set forth.

60. Several electric motors working on a common load, whose armatures are supplied with current from a generator having a separately-excited field, and means by which the field of the generator can be varied and reversed for the purpose of varying the electromotive force and direction of the current through the motor-armatures, substantially as set forth.

This specification signed and witnessed this 21st day of January, 1901.

H. WARD LEONARD.

Witnesses:
 FRANK L. DYER,
 ARCHIBALD G. REESE.